Figure 1:
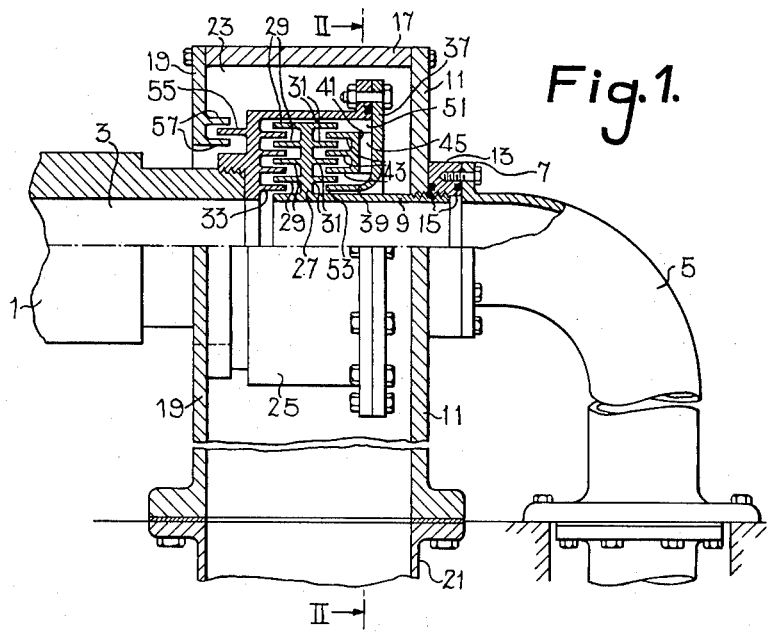

United States Patent Office 3,259,391
Patented July 5, 1966

3,259,391
INLET GLANDS FOR LIQUID SUPPLY TO ROTORS
Istvan Csillag, Sale, England, assignor to Associated Electrical Industries Limited, London, S.W. 1, England, a British company
Filed May 31, 1963, Ser. No. 284,475
Claims priority, application Great Britain, June 13, 1962, 22,709/62
6 Claims. (Cl. 277—13)

This invention relates to improvements in inlet glands for liquid supply to rotors, and more particularly to inlet glands for the supply of cooling water to the rotors of turbo-generators.

The supply of water to the water cooled rotor of a turbo-generator conveniently is from a stationary inlet pipe axially into the end of the rotor shaft or of an extension shaft secured coaxially to that rotor shaft. It is necessary that the water shall be pumped into the rotor under pressure, and this introduces the problem of providing a watertight or substantially watertight seal between the stationary inlet pipe termination and the rotor, which in use revolves at such high speeds that any form of contact seal or packing is most undesirable.

An object of the present invention is the provision of an improved inlet gland for liquid supply to rotors.

According to the present invention, an inlet gland for liquid supply to a rotor comprises a fixed supply pipe arranged to supply liquid axially into one end of the rotor shaft or of an axial extension of that shaft, a labyrinth seal comprising a first set of concentric cylindrical members fixed coaxially to and rotating with the rotor and a second set of concentric cylindrical members fixed coaxially to and remaining stationary with the supply pipe, the members of the first set being interleaved with those of the second set, the arrangement being such that liquid leaking from the junction of the supply pipe and the rotor flows first in a radially outwards direction through the labyrinth seal, and through a radially inwardly extending flow path from the periphery of the labyrinth seal towards the axis of the rotor, the inlet gland also including a series of blades or partitions disposed in that flow path and arranged to rotate with the rotor and to produce in the inwardly extending flow path, when the rotor is rotating, an outwardly increasing hydraulic pressure gradient greater than that poduced by centrifugal force in the labyrinth seal, whereby leakage of liquid through the labyrinth seal is reduced when the rotor is caused to rotate.

Preferably the radially inwardly extending flow path includes a second labyrinth seal similar to the first labyrinth seal and arranged to seal the space between the axially directed edges of the blades or vanes or the axially directed side of a member in which the partitions are provided, and the non-rotating wall of the inwardly extending flow path, thereby reducing circulatory flow of liquid in this inwardly extending flow path and enabling the inlet gland to accommodate appreciable axial displacements between the rotor end and the fixed supply pipe.

Figure 2:
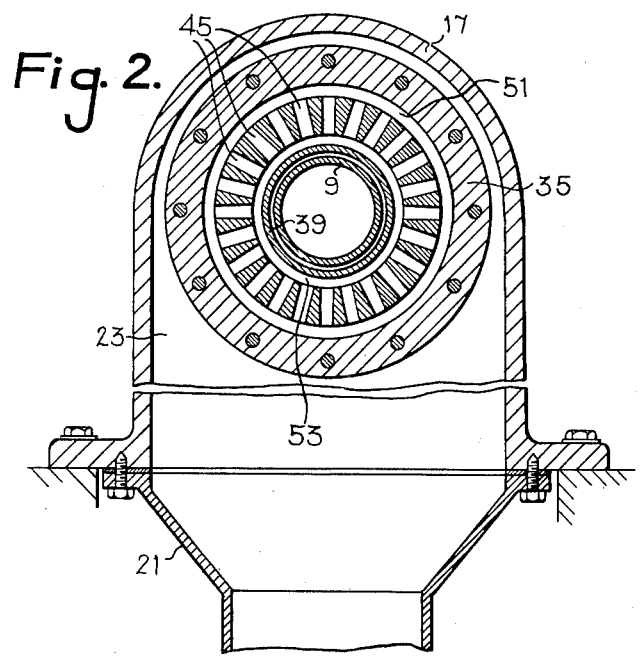

The invention will now be described, by way of example, with reference to the accompanying drawings, in which:

FIGURE 1 is a side elevation, partly in section, of an end part of an extension shaft fitted to a turbo-generator rotor shaft and of a water inlet gland fitted thereto; and FIGURE 2 is a sectional end view taken on the line II—II of FIGURE 1 and as viewed in a direction indicated by the arrows.

An extension shaft 1 is fitted coaxially to the outboard end of a rotor shaft (not shown), and is formed with a central bore 3 for the flow of cooling water to the rotor. The cooling water is supplied through a fixed supply pipe 5 having a flanged outlet 7 arranged coaxially with the bore 3. Positioned between and in alignment with outlet 7 and bore 3 is a tube 9, the end of the tube 9 adjacent the outlet 7 being of reduced diameter to provide a shoulder by which the tube is clamped to a plate 11 by a nut 13 engaging a screw-threaded part of the tube end. Nut 13 is provided on both sides with sealing rings 15 and is clamped to the flanged outlet 7. The plate 11 is bolted to a shell 17 having its opposite end partly closed by an annular plate 19 and having a drain pipe 21 connected to its lowest point. Shell 17 encloses a chamber 23 in which is arranged the actual water gland 25.

The tube 9 is provided near its axially inboard end with a radially extending circumferential flange 27 from which extends in both axial directions four concentric cylindrical members 29 and 31. Members 29 extend towards the rotor and are interleaved with five concentric cylindrical members 33 forming part of a generally cylindrical shell 35 screwed onto the end of the shaft 1. The outboard end of this shell 35 is flanged and has clamped to it and annular plate 37. The inner edge of the plate 37 is formed with a cylindrical projection 39 which fits closely about the tube 9 and extends into the space between the innermost of the members 31 and the tube 9. Outwardly of projection 39, plate 37 is formed with an annular projection 41 terminating in three concentric cylindrical members 43 which are interleaved with the four members 31. The part of the projection 41 between members 43 and the main part of plate 37 is formed with a multiplicity of radial holes 45 (see FIGURE 2) which provide communication between an outer part 51 and an inner part 53 of the annular liquid flow space lying between plate 37 and flange 27. The partitions between the holes 45 act as blades or vanes.

The inboard or rotor side of the shell 35 is formed with a cylindrical projection 55 extending between two concentric projections 57 formed on the plate 19 and forming with those projections a labyrinth seal.

In use of the rotor, water is fed under pressure into the supply pipe 5 and flows through the tube 9 into the bore 3 and so to the cooling passages of the turbo-generator rotor. Since the water is at a pressure above that of the atmosphere, it tends to leak outwardly through the first labyrinth seal formed by the interleaved members 29 and 33, and then inwardly from the outer part 51 to the inner part 53 of the flow space containing the second labyrinth seal formed by the interleaved members 31 and 43, mainly through the holes 45. The water then leaks between the projection 39 and the tube 9 drains from the chamber 23 away through the drain pipe 21.

When the rotor, and thus the shaft 1, is stationary, water will seep through the first labyrinth seal and through the holes 45 in the manner described in the preceding paragraph. The second labyrinth seal is not effective, since it is by-passed by the holes 45. The rate of leakage will be such as to set up a pressure drop substantially equal to the pressure in the supply pipe 5.

When the rotor, and thus the shaft 1, is rotating, centrifugal force will act upon the water in the first labyrinth seal, upon the water in the second labyrinth seal, and upon the water in the holes 45. The water in the labyrinth seals will be rotating at a speed approximately half that of the rotor, but the water in the holes 45 will be rotating at the full speed of the rotor. As a result the difference in pressure produced by the centrifugal force will be about four times greater in the holes 45 than across each of the seals. This difference in pressure will produce an intense recirculation of water, through the holes and back through the second seal, which increases the pressure gradient across this second seal, and thus reduces the general leakage through the gland as a whole.

In some cases, where the pressure in the supply pipe 5 is sufficiently low and the speed of the rotor is sufficiently high, the leakage of water can be completely eliminated.

What I claim is:

1. An inlet gland for liquid supply to a rotor comprising:
   (a) a fixed supply pipe arranged to supply liquid axially into one end of a hollow rotor shaft or an axial extension of that shaft;
   (b) a labyrinth seal comprising a first set of concentric cylindrical members fixed coaxially to and rotatable with the rotor shaft and a second set of concentric cylindrical members fixed to and remaining stationary with the supply pipe;
   (c) a liquid flow path extending from the junction of the supply pipe and the rotor shaft and including a first part extending in a radially outwards direction through the labyrinth seal, and a second part extending in a radially inwards direction towards the axis of the rotor shaft; and
   (d) a series of blades or vanes or partitions constituting pump impeller blades mounted on the rotor shaft so as to rotate therewith and disposed in the radially inwardly extending part of the liquid flow path, these blades being adapted, when the rotor shaft is rotating, to produce in this part of the flow path an outwardly increasing hydraulic pressure gradient which is greater than that produced by centrifugal force in the labyrinth seal and which therefore inhibits leakage of liquid through the labyrinth seal.

2. An inlet gland according to claim 1, in which a second labyrinth seal is disposed in the inwardly extending part of the flow path and includes a first set of concentric cylindrical members mounted on and rotatable with the rotor shaft and a second set of concentric cylindrical members fixed to and remaining stationary with the supply pipe.

3. An inlet gland according to claim 2, in which a radial flange on the supply pipe carries on one side the second set of cylindrical members of the first labyrinth seal and on the opposite side the second set of cylindrical members of the second labyrinth seal.

4. An inlet gland according to claim 3, in which a stationary casing is secured to the supply pipe and is arranged to enclose the rotatable parts of the gland, and a drain is connected to a lower level of the casing for liquid which escapes from the second labyrinth seal.

5. An inlet gland according to claim 4, in which a further labyrinth seal is provided where the rotor shaft extends through the casing, and this seal includes cylindrical parts carried by and rotatable with the rotor and coaxial cylindrical parts carried by and remaining stationary with the casing.

6. An inlet gland according to claim 1, in which the pump impeller blades are so arranged that they provide a multiplicity of radial flow passages evenly spaced about the axis of the rotor shaft.

References Cited by the Examiner
UNITED STATES PATENTS

| | | | |
|---|---|---|---|
| 1,394,959 | 10/1921 | Wilkinson | 277—13 |
| 2,434,901 | 1/1948 | Buck et al. | 277—57 XR |
| 2,479,038 | 8/1949 | Cronstedt | 277—57 XR |
| 3,127,181 | 3/1964 | Crego et al. | 277—3 |

SAMUEL ROTHBERG, *Primary Examiner.*